United States Patent [19]

Cooper

[11] Patent Number: 5,031,502
[45] Date of Patent: Jul. 16, 1991

[54] ADJUSTABLE POWDER MEASURE

[76] Inventor: Peter D. Cooper, 6 Christchurch Drive, Hartburn, Stockton-on-Tees, Cleveland, TS18 5JZ, England

[21] Appl. No.: 575,360

[22] Filed: Aug. 30, 1990

[30] Foreign Application Priority Data

Sep. 6, 1989 [GB] United Kingdom ............... 8920172

[51] Int. Cl.⁵ ............................................. F42B 33/02
[52] U.S. Cl. ............................................. 86/33; 42/90
[58] Field of Search ............... 42/90; 86/20.14, 23, 86/31, 32, 33

[56] References Cited

U.S. PATENT DOCUMENTS

| 42,741 | 5/1864 | Bradford | 42/90 |
|---|---|---|---|
| 387,171 | 7/1888 | Lutz | 86/33 |
| 2,820,392 | 1/1958 | Schmidt | 86/33 |
| 4,112,606 | 9/1978 | Griffin | 42/90 |
| 4,571,873 | 2/1986 | Houk | 42/90 |

FOREIGN PATENT DOCUMENTS 1296 of 1855 United Kingdom ................ 86/33

Primary Examiner—Charles T. Jordan
Attorney, Agent, or Firm—Iandiorio & Dingman

[57] ABSTRACT

The adjustable powder measure is designed to effect the reloading of firearm cartridge cases. It comprises a main body in the form of a transparent powder container 6 with a transparent center tube 7 able to slide inside the container and powder contents. Measuring and dispensing is viewed through the transparent components. The friction fit plug 8 is adjusted to obtain the desired volume by insertion of a graduated rod 10 into the bore of the center tube. A reprimed cartridge case 1 is attached to the transparent pliable end tube 2, the powder measure being held vertically with the cartridge case at the top. The center tube is drawn below powder level, filling the measuring cavity above the friction fit plug. The center tube is then pushed through a sealing washer 4. Inverting the powder measure allows only the cavity contents to drop into the cartridge case.

11 Claims, 1 Drawing Sheet

SECTION ON A A

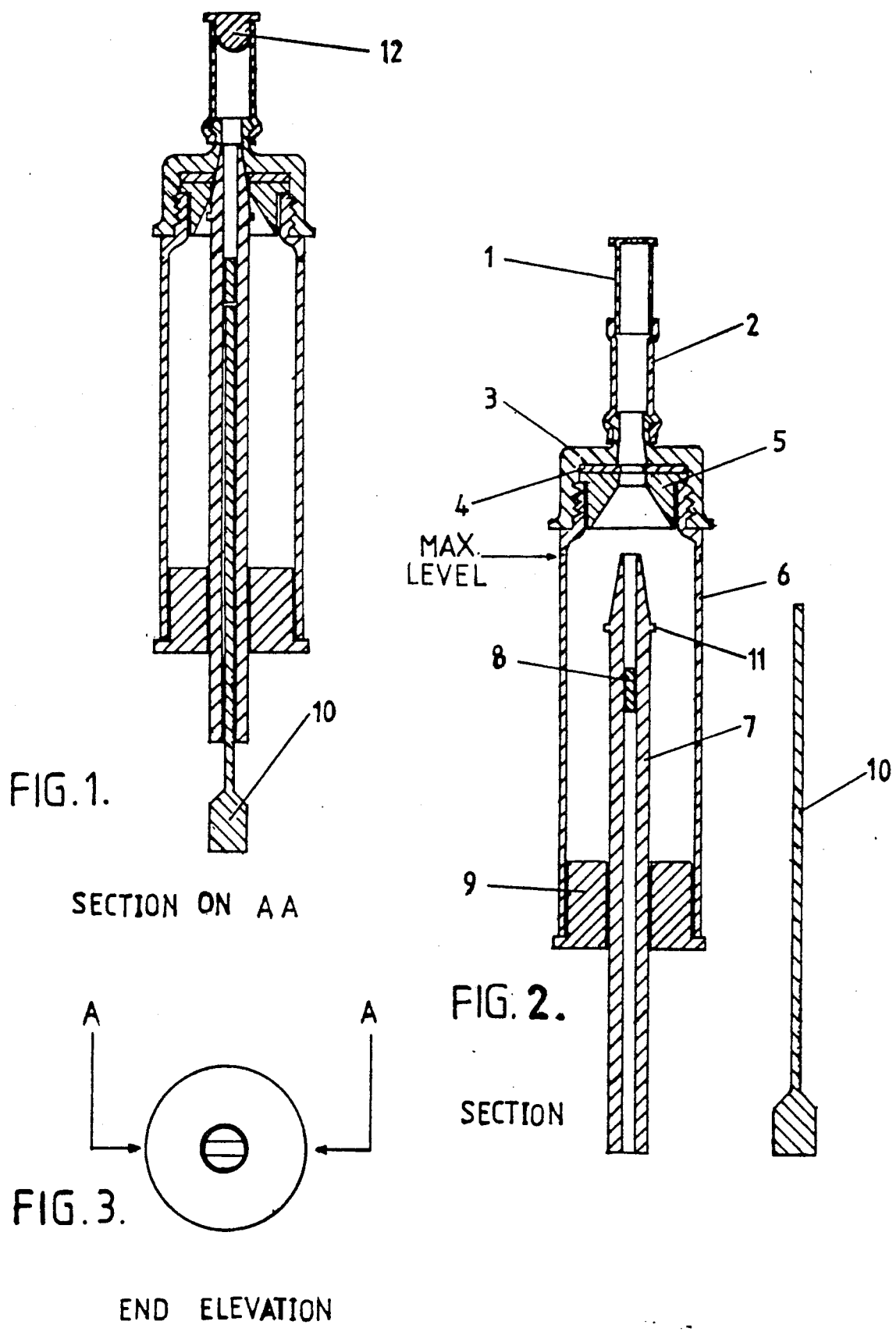

ADJUSTABLE POWDER MEASURE

This invention relates to an adjustable powder measure and, more especially, this invention relates to an adjustable powder measure for use in reloading reprimed cartridge cases with explosive powder. The adjustable powder measure is designed to effect the reloading of reprimed firearm cartridge cases by measuring explosive powders by volume, volume being directly related to load in weight.

Known powder measures which are available vary from plastic scoop sets in which each scoop is of a fixed measure, to complex lever operated machines. The plastic scoop sets used with an open tray of powder are prone to problems of powder spillage and they necessitate the handling of four items, that is the tray of powder, the scoop, a funnel and a cartridge case. The lever operated machines, although adjustable, are expensive and they require bench mounting.

It is an aim of the present invention to provide an adjustable powder measure in which the above problems are obviated or reduced.

Accordingly, this invention provides an adjustable powder measure for use in reloading reprimed cartridge cases with explosive powder, which adjustable powder measure comprises a transparent powder container, a transparent tube which is adapted to slide axially in the transparent powder container and which has a tube bore which is provided with a variable measuring cavity for extracting a measured portion of powder during vertical axial movements, and sealed and transparent dispensing means for dispensing the measured portion of powder into a cartridge case upon inversion of the adjustable powder measure.

The adjustable powder measure of the present invention is preferably constructed from transparent static free plastic material. The measuring and dispensing of powder is viewed through the transparent components and is able to take place under totally enclosed conditions. Only one item is handled, namely the powder measure with the cartridge case attached. The use of plastic materials enables the adjustable powder measure ideally to be produced by injection moulding techniques.

An embodiment of the invention will now be described solely by way of example and with reference to the accompanying drawings in which:

FIG. 1 shows in section an adjustable powder measure with a variable measuring cavity sealed off from a main body interior, and with a graduated adjusting rod inserted into a centre tube bore;

FIG. 2 shows in section the adjustable powder measure with the variable measuring cavity below powder level and the graduated adjusting rod alongside; and FIG. 3 shows an end elevation of the adjustable powder measure.

The general operation of the adjustable powder measure shown in the drawings is as follows.

Referring to the drawings, the adjustable powder measure comprises a main body in the form of a transparent powder container 6 with a transparent centre tube 7 able to slide axially inside the container 6 and its powder contents. A first guide means in the form of a base guide means 9 is used for axial control. A friction fit plug 8 is adjusted to obtain the desired volume by insertion of a grduated rod 10 into the bore of the centre tube 7. A reprimed cartridge case 1 attached to a transparent pliable end tube 2, the powder measure being held vertically with the cartridge case 1 at the top. The variable measuring cavity fills with powder when drawn below powder level. A catchment lug 11 on the tube prevents separation of the tube from the container 6 when powder is at a low level. Pushing the centre tube up through second guide means in the form of a top guide hollow taper 5 and through a sealing washer 4 causes isolation of the variable measuring cavity contents from the container contents. A main body tubular cap 3 arrests upward movement of the tube. The cartridge case 1 receives the variable measuring cavity contents upon inversion of the powder measure. All operations are viewable through the transparent components.

The detailed operation of the adjustable powder measure as shown in the drawings is as follows.

1. Hold the powder measure by the container 6 and using the graduated adjusting rod 10, set the friction fit plug 8 to obtain the position for the measured volume by pushing the plug 8 up the centre tube 7 from the open bottom end of the bore, reading off the scale for the desired load against the centre tube end. Remove the graduated adjusting rod 10.

2. Unscrew and remove the main body tubular cap 3 complete with the pliable end tube 2, storage blank 12 and sealing washer 4.

3. Retract the centre tube 7 to the maximum powder level mark on the container 6.

4. Insert a small funnel into the container 6 using the hole through the top guide taper 5.

5. Pour in powder from the manufacturer's container, filling the container 6 up to the maximum powder level mark.

6. Replace the main body tubular cap 3 complete with the pliable end tube 2, storage blank 12 and sealing washer 4.

7. Remove the storage blank 12 from the pliable end tube 2 and replace it with a reprimed cartridge case 1.

8. Hold the powder measure by the container 6 in a vertical position with the cartridge case 1 at the top.

9. Draw down the centre tube and observe that the top end of the tube is one centimeter or more below powder level.

10. Tap on the container 6 with the forefinger to shake the powder into the variable measuring cavity.

11. Push the centre tube up clear of the powder level and tap gently on the container 6 and observe the removal of surplus powder from the top of the variable measuring cavity.

12. Push the centre tube up into the sealing washer 4 until it will travel no further, thus sealing off the measured load from the main body powder contents.

13. Invert the powder measure and observe that the measured powder drops into the cartridge case 1.

14. Remove the cartridge case 1 and stand it in a safe place ready to be fitted with a bullet.

15. Fit another cartridge case 1 and repeat operations 8 to 14. Continue reloading until the powder reaches a low level and then refill the powder measure.

It is to be appreciated that the embodiment of the invention described above with reference to the accompanying drawings has been given by way of example only and that modifications may be effected.

What is claimed is:

1. An adjustable powder measure for use in reloading reprimed cartridge cases with explosive powder, which adjustable powder measure comprises a transparent powder container, a transparent tube which is adapted to slide axially in the transparent powder container and which has a tube bore which is provided with a variable measuring cavity for extracting a measured portion of powder during vertical axial movements, and sealed and transparent dispensing means for dispensing the measured portion of powder into a cartridge case upon inversion of the adjustable powder measure.

2. An adjustable powder measure according to claim 1 and including calibration means for adjustment of the variable measuring cavity.

3. An adjustable powder measure according to claim 2 and including first guide means which is provided at the base of the powder container remote from the dispensing means in order to control axial movements of the tube.

4. An adjustable powder measure according to claim 3 and including catchment means which is provided adjacent the variable measuring cavity for arresting downward axial movement of the tube.

5. An adjustable powder measure according to claim 4 in which the catchment means is adapted to co-operate with the first guide means to prevent separation of the tube from the powder container.

6. An adjustable powder measure according to claim 5 and including second guide means which is provided inside the top of the container remote from the first guide means in order to centralize upward axial movement of the tube.

7. An adjustable powder measure according to claim 6 and including sealing means which is provided adjacent the second guide means to isolate the contents of the variable measuring cavity from the contents of the powder container during use of the adjustable powder measure.

8. An adjustable powder measure according to claim 7 and including a tubular cap which is provided at the powder container top adjacent the sealing means.

9. An adjustable powder measure according to claim 8 in which the tubular cap is adapted to arrest upward axial movement of the tube.

10. An adjustable powder measure according to claim 9 in which a transparent pliable tube is provided on an outlet part of the tubular cap.

11. An adjustable powder measure according to claim 10 in which the transparent pliable tube outlet is adapted to retain a cartridge case.

* * * * *